3,518,092
COMESTIBLE COATING COMPOSITION
Stanley P. Rock, Flushing, Howard Roth, Bronx, and John E. Sommers, Valley Stream, N.Y., assignors to DCA Food Industries Inc., New York, N.Y.
No Drawing. Continuation of application Ser. No. 529,974, Feb. 25, 1966. This application May 2, 1969, Ser. No. 821,500
Int. Cl. A21d 13/08
U.S. Cl. 99—92                        8 Claims

ABSTRACT OF THE DISCLOSURE

A sugar-dusting composition comprises a powdered mixture of 53% to 92.5% sugar, 4% to 30% starch, 2% to 8% shortening and ½% to 9% of a waxy material such as stearine. The waxy material is in the form of spheres in the mixture, with 90% thereof being under 200 micron diameter and forms coating layers on the sugar particles, which layers are coated by the shortening and starch. The composition is produced by mixing the sugar and particulate waxy material, applying the shortening in a liquid state while agitating, and then admixing the starch.

---

The present application is a continuation of copending patent application Ser. No. 529,974, filed Feb. 25, 1966, and now abandoned.

The present invention relates generally to improvements in comestible compositions and particularly to improved dusting or sugar coating compositions for such comestibles as fried cakes, doughnuts and the like, and to methods of producing the same.

It is conventional practice to apply a sweet powdered coating or dusting composition to such baked products as fried cakes, as doughnuts and the like. These dusting compositions should be sweet, highly palatable, of attractive appearance, easy to apply, adherent, highly stable and of low cost. The dusting compositions heretofore available are lacking in at least one or more of the desired properties for such compositions. Dusting compositions on powdered doughnuts are frequently exposed to extremes of environments and conditions which adversely affect the powdered coating. The fat which is carried by the doughnut often migrates into the powdered coating and imparts a splotchy, unsightly appearance to the product with an attendant loss of powderiness and whiteness and inevitable decrease in salability. Moreover, in addition to the moisture contained in the doughnut, the powdered coating is exposed to ambient moisture, atmospheric moisture and that contained in the carton in which the doughnuts are packaged. Under many conditions, particularly at high temperatures and humidities, sufficient moisture is adsorbed by the powdered coating to affect the solution thereof with resulting dripping and a slimy unattractive appearance of the product bearing the same. A further consequence of the nature of the conventional cake dusting compositions is the necessity of varying the ingredients of the compositions for differences in climatic and weather conditions apart from the necessity of controlling the composition and properties of the frying fat. Another drawback of the conventional dusting compositions is the complex procedures which must be followed in their production, requiring the heating of ingredients thereof and close temperature control in the process.

It is, therefore, a principal object of the present invention to provide an improved comestible composition.

Another object of the present invention is to provide an improved cake dusting composition.

Still another object of the present invention is to provide an improved doughnut dusting composition of high stability under adverse conditions of ambient temperature and humidity.

A further object of the present invention is to provide an improved doughnut dusting composition which is resistant to the adverse effects of the doughnut-carried frying fat.

Still a further object of the present invention is to provide a dusting composition of the above nature characterized by its attractive appearance and high stability over a wide range of ambient conditions, ease of production and application thereof and its low cost.

The above and other objects of the present invention will become apparent from a reading of the following description which set forth preferred embodiments thereof.

The present invention in a sense is based on the discovery that a dusting composition comprising a powdered mixture of sugar, starch, shortening and a particulate waxy material overcomes the many drawbacks of the conventional dusting compositions when employed as a coating for fried cakes. The improved dusting composition of the present invention exhibits an unexpectedly superior stability even under the most adverse conditions of ambient temperature and humidity, being characterized by minimum absorption of water and fat under these conditions, while the composition is easy to produce and to apply and is of attractive appearance and low cost.

It has been discovered that stearine, for example, the completely hydrogenated triglycerides of cottonseed, soybean or other fat-containing fatty acids of sufficient chain length or other saturated fatty acids, crystallizes as a hard solid which is not easily deformable and is close to 100% solid at temperatures below 110° F. and, if in a particulate spherical state and used to coat a sugar, a large part of the protection offered by coating the sugar with melted stearine followed by crystallization is obtained, which is, however, far superior to the customary formulations, and the objectionable characteristics of poor eating quality are eliminated. In addition, the powdered spherical stearine can be dry mixed with the sugar, as one mixes any two powders together, to get this protection and no special heating or cooling down processes are required. Since 110° F. is at the high end of the ambient range for summer conditions there is no variation in the amount of liquid fraction present, and moreover, the protection is provided uniformly at all common ambient temperature conditions and the stearine barrier is not weakened by dissolving in the oil used to attain cohesion.

A further discovery that has been made is that this powdered stearine coating the sugar has the unique property of retarding oil migration from the surface of doughnuts through the sugar coating. Whereas a powdered sugar coating made with hard fat sprayed onto the sugar when applied to a doughnut fried in oily fat discolored within a few hours after coating, other doughnuts made in the same way treated with the product of the present invention were still white and powdery for at least 24 hours longer. A further discovery has been the method by which the liquid oil, used to attain cohesion, can be added, a procedure which insures uniform distribution of the oil with resulting uniform cohesiveness. It has been found that if immediately after distributing the stearine about the sugar, the oil is sprayed and mixed for a time with the stearine-coated sugar before the starch is added, then mixing to get uniform cohesive properties is further facilitated.

The sugar may be dextrose, lactose or sucrose or combinations thereof and advantageously constitutes between 53% and 92.5% by weight of the composition. The dextrose and lactose may be anhydrous, or hydrated in whole or in part. The starch may be of any type, for example, corn, tapioca, rice and the like or combinations thereof. The starch advantageously constitutes between 4% and 30% by weight of the composition. The shortening may be any palatable triglyceride or combination thereof and advantageously constitutes between 2% and 8% by weight of the composition and contains a fraction between 70% and 95% of the composition, which fraction is liquid at 70° F. The waxy material should be free flowing and non-deformable under ordinary mixing conditions and at temperatures up to 95° F., and should be insoluble in water and of a spherical particulate nature. Furthermore, the great majority of the particles, preferably at least 90% thereof, should have a diameter of less than 200 microns. While stearine, either animal or vegetable, is preferred as the waxy material, other waxy materials may be employed provided that they meet the conditions above set forth. Among such materials are powdered edible fats, waxes, fat-like substances, salts of fatty acids, for example, calcium stearate, and combinations thereof. The waxy material advantageously constitutes between ½% and 9% by weight of the improved dusting composition. What is meant by ordinary mixing conditions are the usual methods of blending dry and liquid materials to form an homogeneous dry powder mixture, such as mixing in a ribbon blender, twin-shell blender, trowel blender, and certain finishers such as attrition mills.

A preferred formulation of the improved composition is as follows:

| Ingredients | Parts by weight |
| --- | --- |
| Hydrated dextrose | 60–77 |
| Starch | 4–20 |
| Shortening | 3–5 |
| Powdered stearine | 3–5 |

The hydrated dextrose preferably has the following particle size distribution:

| Particle size | Percent Minimum | Percent Maximum |
| --- | --- | --- |
| 74 microns | 25 | 55 |
| 150 microns | 70 | 95 |
| 841 microns | 0.5 | None |

Anhydrous dextrose or other sugars, as set forth above, may be substituted in whole or in part for the hydrated dextrose although the latter is preferred for functional and economic reasons. The shortening is as above described and is advantageously a fat that is liquid at normal room temperatures and has a stability as measured by the AOM method of more than 25 hours. The particles of the powdered stearine are substantially spherical and advantageously at least 95% thereof have a diameter not exceeding 120 microns.

In addition to the sugar, starch, shortening and powdered waxy material, the improved composition may contain other material or additives, preferably in relatively minor amounts such as salt, tricalcium phosphate, titanium dioxide, oat flour, flavoring, wheat flour, etc.

The dusting composition is advantageously produced by first thoroughly mixing the sugar and the spherical particulate waxy material at a temperature somewhat below the deformable temperature of the particulate waxy material, the spherical particulate waxy materials forming coating layers on the individual sugar particles. The minor additives, as noted above, are then added, with continued mixing. The shortening in a liquid state and at a temperature a little above its melting point, for example by about 5° F., and not much higher than the waxy material deformation temperature, is applied to and distributed throughout the mixture by spraying it onto the tumbling mixture. Thereafter, the starch is added and a uniform mixture effected.

The following example of the improved dusting composition is given merely by way of illustration of the present invention and is not intended to limit the scope thereof:

| Ingredient | Percent by weight |
| --- | --- |
| Hydrated dextrose | 77.50 |
| Oil | 3.97 |
| Avenex | 0.20 |
| Salt | 0.10 |
| Corn starch | 15.30 |
| Powdered stearine | 2.93 |

The hydrated dextrose, corn starch and powdered stearine are of the properties above set forth. The oil is refined soybean oil which is completely liquid above 25° F. Avenex is a concentrated colloidal fraction of the oat grain and is used as an antioxidant.

In producing the dusting composition according to the present invention, one half the dextrose is added to a Robinson ribbon blender operated at 60 to 80 revolutions per minute. The powdered stearine is then added, followed by the remainder of the dextrose, the Avenex and the salt and any other desired minor ingredients, and mixing is continued for a period of four minutes. The above ingredients are introduced into the mixer at a temperature between 85° F. and 95° F. The liquid shortening is then sprayed thereon at a temperature of 95° F. and mixing is continued for six minutes after which corn starch is added and the mixing continued for another four minutes.

The improved dusting composition described above not only possesses properties superior to those of the conventional dusting compositions but it is easier to produce and is less costly. The improved dusting composition is applied to the comestible in conventional manner and requires lesser amounts than normally employed while maintaining a greater stability toward moisture dissolution and greying and permitting greater flexibility in packaging and a wider range of moisture content in the coated doughnuts. In addition, the improved composition is considerably more resistant to oil absorption and staining at elevated storage temperatures and does not require seasonal modifications of the fat formulation. The process in producing the improved composition is superior to that conventionally employed since, among other reasons, the high temperature spraying of hard fats and the commonly employed step of Dry Ice pack-off are obviated as well as special finishing procedures and a close process control is not required for producing a uniform product from batch to batch.

While there have been described preferred embodiments of the present invention it is apparent that numerous alterations, omissions and additions may be made without departing from the spirit thereof.

What is claimed is:

1. A coating composition comprising a powdered mixture of 53% to 92.5% sugar, 4% to 30% starch, 2% to 8% shortening and ½% to 9% of a water-insoluble waxy material selected from the class consisting of stearine, powdered edible fats, waxes, salts of fatty acids and combinations thereof, said waxy material being in a substantially spherical particulate state with at least 90% thereof having a particle size not exceeding 200 microns.

2. The coating composition of claim 1, wherein said waxy material is stearine and at least 95% of which material is of a particle size not exceeding 120 microns.

3. The coating composition of claim 1, wherein said waxy material is non-deformable under ordinary mixing conditions at a temperature below 90° F.

4. The coating composition of claim 3, wherein said sugar is selected from the class consisting of sucrose, dextrose, lactose and combinations thereof.

5. The coating composition of claim 1, wherein said sugar comprises hydrated dextrose and constitutes 60% to 77% by weight of said composition, said starch constitutes 4% to 20% by weight of said composition, said shortening is liquid above 20° F. and constitutes 3% to 5% by weight of said composition, and at least 95% of said waxy material comprises substantially spherical stearine particles of a size not exceeding 120 microns and constitutes 3% to 5% by weight of said composition.

6. The composition of claim 5, wherein between 25% and 55% of said sugar is of particle size less than 74 microns and between 70% and 95% of said sugar is of particle size less than 150 microns.

7. A method of producing a coating composition comprising preparing a dry particulate mixture comprising 53% to 92.5% sugar, and 0.5 to 9% of a water-insoluble waxy material selected from the class consisting of stearine, powdered edible fats, waxes, salts of fatty acids and combinations thereof, said waxy material comprising substantially spherical particles at least 90% of which have a particle size not exceeding 200 microns, applying 2 to 8% of a fluid shortening to said dry particulate mixture and thereafter adding 4 to 30% starch to said mixture.

8. The method of claim 7, wherein said waxy material is stearine and is initially admixed with said sugar at a temperature between 85° F. and 95° F., said shortening being thereafter sprayed in a molten liquid state into said mixture while agitating said mixture, and said starch is then added to said mixture.

References Cited
UNITED STATES PATENTS 2,144,371  1/1939  Griffith et al. _____ 99—92

LIONEL M. SHAPIRO, Primary Examiner

J. R. HOFFMAN, Assistant Examiner

U.S. Cl. X.R.

99—118, 166